US011321745B1

(12) United States Patent
Chionna

(10) Patent No.: US 11,321,745 B1
(45) Date of Patent: May 3, 2022

(54) AD BANNER OVERLAY

(71) Applicant: Enrico Chionna, San Francisco, CA (US)

(72) Inventor: Enrico Chionna, San Francisco, CA (US)

( * ) Notice: Subject to any disclaimer, the term of this patent is extended or adjusted under 35 U.S.C. 154(b) by 97 days.

(21) Appl. No.: 16/914,023

(22) Filed: Jun. 26, 2020

Related U.S. Application Data

(60) Provisional application No. 62/867,814, filed on Jun. 27, 2019, provisional application No. 62/867,816, filed on Jun. 27, 2019, provisional application No. 62/867,818, filed on Jun. 27, 2019.

(51) Int. Cl.
*G06Q 30/02* (2012.01)
*G06F 3/04812* (2022.01)

(52) U.S. Cl.
CPC ..... *G06Q 30/0277* (2013.01); *G06F 3/04812* (2013.01); *G06Q 30/0271* (2013.01); *G06Q 30/0272* (2013.01)

(58) Field of Classification Search
None
See application file for complete search history.

(56) References Cited

U.S. PATENT DOCUMENTS

| | | | |
|---|---|---|---|
| 7,783,980 B1 | 8/2010 | Herold | |
| 8,099,109 B2 | 1/2012 | Altman et al. | |
| 8,190,474 B2 | 5/2012 | Lerman et al. | |
| 8,196,050 B2 | 6/2012 | Riley et al. | |
| 8,560,387 B2 | 10/2013 | Amidon et al. | |
| 8,768,766 B2 | 7/2014 | Ellis et al. | |
| 8,872,846 B2 * | 10/2014 | Kew | G06Q 30/0226 345/629 |
| 9,282,129 B2 | 3/2016 | Leibovich et al. | |
| 9,299,090 B1 | 3/2016 | Tsypliaev et al. | |
| 9,965,768 B1 | 5/2018 | Doane et al. | |
| 10,121,163 B2 | 11/2018 | Salari | |
| 10,200,654 B2 | 2/2019 | Szymczyk et al. | |
| 10,235,688 B2 | 3/2019 | Beatty et al. | |
| 10,282,713 B2 | 5/2019 | Ham | |

(Continued)

OTHER PUBLICATIONS

Arency option configured to adjust transparency of advertisements. c. Advanced Ads, "Background Ads (Skin Ads) Placement", retrieved from https://wpadvancedads.com/manual/background-skin-ads-placement/, available on Dec. 1, 2016 (Year: 2016).*

(Continued)

*Primary Examiner* — Sam Refai
(74) *Attorney, Agent, or Firm* — Maschoff Brennan

(57) ABSTRACT

Presenting digital ads on user devices through banner overlays. In one embodiment, a method may include displaying a page on a screen of a user device. The method may also include overlaying a banner having at least one ad above at least a portion of the page so that the banner covers an underlying portion of the page. The method may further include determining whether the banner is in a passive or active state. When the banner is in a passive state, user input on the banner may pass through the banner to the underlying portion of the page. When the banner is in an active state, user input on the banner is received by the banner. A user may be able to provide input determining whether the banner is in an active or passive state.

17 Claims, 10 Drawing Sheets

(56) References Cited

U.S. PATENT DOCUMENTS

| | | |
|---|---|---|
| 10,546,326 B2 | 1/2020 | Publicover et al. |
| 2004/0243482 A1 | 12/2004 | Laut |
| 2006/0156330 A1 | 7/2006 | Chiu |
| 2006/0218036 A1 | 9/2006 | King et al. |
| 2006/0271425 A1 | 11/2006 | Goodman et al. |
| 2007/0265922 A1 | 11/2007 | Dumond et al. |
| 2009/0112724 A1 | 4/2009 | Joo |
| 2011/0119352 A1 | 5/2011 | Perov et al. |
| 2011/0288913 A1 | 11/2011 | Waylonis et al. |
| 2012/0036015 A1 | 2/2012 | Sheikh |
| 2012/0150666 A1 | 6/2012 | Savic |
| 2013/0067035 A1 | 3/2013 | Amanat et al. |
| 2013/0211944 A1 | 8/2013 | Momin et al. |
| 2014/0297417 A1 | 10/2014 | Cusack |
| 2014/0344080 A1 | 11/2014 | Rothman et al. |
| 2014/0358260 A1 | 12/2014 | Burgin et al. |
| 2015/0100403 A1 | 4/2015 | Roberts et al. |
| 2015/0112778 A1 | 4/2015 | Feldman et al. |
| 2015/0363807 A1 | 12/2015 | Katz et al. |
| 2016/0321690 A1 | 11/2016 | Ma |
| 2018/0300771 A1* | 10/2018 | Roger ............... G06Q 30/0277 |

OTHER PUBLICATIONS

Facebook Inc., "Connecting People to Brands and Products on Mobile", Dated Oct. 12, 2015.

Facebook Inc. "Recent Ad Activity Feature Allows Users to Revisit Ads", Dated Sep. 22, 2017.

Pardes, Arielle; "Instagram Now Lets You Share Pics with Just Close Friends'—What it is and how to use it"; Web article located at: https://www.wired.com/story/instagram-close-friends/; wired.com; Nov. 30, 2018; 5 pages.

Aisch; Gregor et al.; " I he Cost of Mobile Ads on 50 News Websites"; Web article located at: https://www.nytimes.com/interactive/2015/10/01/business/cost-of-mobile-ads.html; NewYorkTimes.com; Oct. 1, 2015; 4 pages.

U.S. Office Action in U.S. Appl. No. 16/915,042 dated Apr. 13, 2021.

U.S. Office Action in U.S. Appl. No. 16/915,042 dated Jul. 20, 2021.

U.S. Office Action in U.S. Appl. No. 16/915,042 dated Sep. 29, 2021.

\* cited by examiner

AD BANNER OVERLAY

CROSS-REFERENCE TO A RELATED APPLICATION

This patent application claims the benefit of and priority to U.S. Provisional Application Nos. 62/867,814, 62/867,816 and 62/867,818, all filed Jun. 27, 2019, which are incorporated by reference in the present disclosure in their entireties for all that they disclose.

BACKGROUND

Marketing, or the promotion of a company's products and/or services, is an essential part of most business models. Many companies employ aggressive advertising campaigns to promote public awareness of their products and services. These ads are presented to consumers in a variety of different formats and in massive quantities, including television commercials, radio ads, direct mail, and billboards. The advertising industry is always looking for new ways to target consumers in a way that will more effectively influence people to buy.

In light of the increasing amounts of time that people spend online, digital advertising has become an important way for companies to promote their products and services. Many of the most popular websites and apps, including social media apps, video streaming apps, gaming apps, free apps, and web browser apps all include ads.

For consumers, ads may be annoying for a variety of reasons. To begin, ads are often presented to people against their will and without their consent. In most cases, people are not given a choice to hide or otherwise avoid an ad. Further, people often lack any control over the way that ads are presented and the types of ads to which they are exposed. This inevitably leads to situations where consumers are presented with ads promoting products and services that the consumer has no interest in purchasing.

In order to make ads more appealing to consumers and to increase the effectiveness of advertising campaigns, improvements can be made to the way in which digital ads are presented to consumers. For example, a system for presenting digital ads that allows consumers more control over what types of ads are presented and how they are presented would be advantageous.

The subject matter described in the present disclosure is not limited to embodiments that solve any disadvantages, address any opportunities and/or improvements, and/or that operate only in environments such as those described above. Rather, the preceding sections are only provided to illustrate one or more example technology areas and/or opportunities for improvements where some embodiments described in the present disclosure may be practiced.

SUMMARY

In one embodiment, a computer-implemented method for presenting digital ads on user devices may be performed. The method may include displaying a page on a screen of a user device. The method may also include overlaying a banner having at least one ad above at least a portion of the page so that the banner covers an underlying portion of the page. The method may further include determining whether the banner is in a passive or active state. When the banner is in a passive state, user input on the banner may pass through the banner to the underlying portion of the page. When the banner is in an active state, user input on the banner may be received by the banner.

In some embodiments, the user device may be a mobile device, the screen may include a touch sensitive technology, and the user input may be a touch on the screen of the user device.

In some embodiments, the banner and the ad may have a level of transparency that allows the underlying portion of the page to remain visible through the banner and the ad.

In some embodiments, a transparency input mechanism may allow the user of the user device to select the level of transparency of the banner and the ad. The transparency input mechanism may be located on the banner.

In some embodiments, the method may further include determining that the banner is in a passive state, receiving a first user input on the banner, and allowing the first user input to pass through the banner to the underlying portion of the page.

In some embodiments, the method may further include receiving a second user input through an interactivity input mechanism that changes the banner from the passive state to an active state, receiving a third user input on the banner and receiving the third user input on the banner.

In another embodiment, a system for presenting digital ads on user devices may include a memory storing program instructions and a processor coupled to the memory that is configured to execute the program instructions. The program instructions may be executable by the processor to display a page on a screen of a user device. The program instructions may also be executable by the processor to overlay a banner having at least one ad above at least a portion of the page so that the banner covers an underlying portion of the page. The program instructions may further be executable by the processor to determine whether the banner is in a passive or active state. When the banner is in a passive state, user input on the banner may pass through the banner to the underlying portion of the page. When the banner is in an active state, user input on the banner may be received by the banner.

In some embodiments, the program instructions may also be executable by the processor to determine that the banner is in a passive state, receive a first user input on the banner, and allow the first user input to pass through the banner to the underlying portion of the page.

In some embodiments, the program instructions may also be executable by the processor to receive a second user input through an interactivity input mechanism that changes the banner from the passive state to an active state, receive a third user input on the banner and receive the third user input on the banner.

Also, in some embodiments, one or more non-transitory computer-readable media may include one or more computer-readable instructions that, when executed by one or more processors of a network device, cause the one or more processors of the network device to perform a method for presenting digital ads on user devices.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings, in which.

DETAILED DESCRIPTION

Ads in general, and especially digital ads, suffer from a number of disadvantages that can make advertising campaigns counterproductive. For example, ads are often presented to people against their will, without their consent, and without any compensation. In most cases, people are not given a choice to hide or otherwise avoid an ad. Further, people often lack any control over how ads are presented, when ads are presented, and the types of ads presented. This inevitably leads to situations where consumers are presented with ads promoting products and services that the consumer has no interest in purchasing.

Some embodiments of the present disclosure describe systems and methods for presenting digital ads on user devices. According to some embodiments, a user may provide input on how ads are presented. For example, a banner containing one or more ads may overlay a page on a user device screen. The user may specify a transparency level for the banner and the ad presented so that portions of the page underlying the banner may remain visible. A user may further specify a screen location and size for the banner. According to some embodiments, a user may also specify the days and/or times that banners containing digital ads are allowed to run on a user's device. According to some embodiments, a user may further specify the types of ads presented in the banners. For example, a user may identify preferences for certain products, services, and/or brands. Alternatively, a user may restrict ads on certain products, services, and/or brands. Finally, in some embodiments, a user may be compensated for viewing ads.

Figure 1:
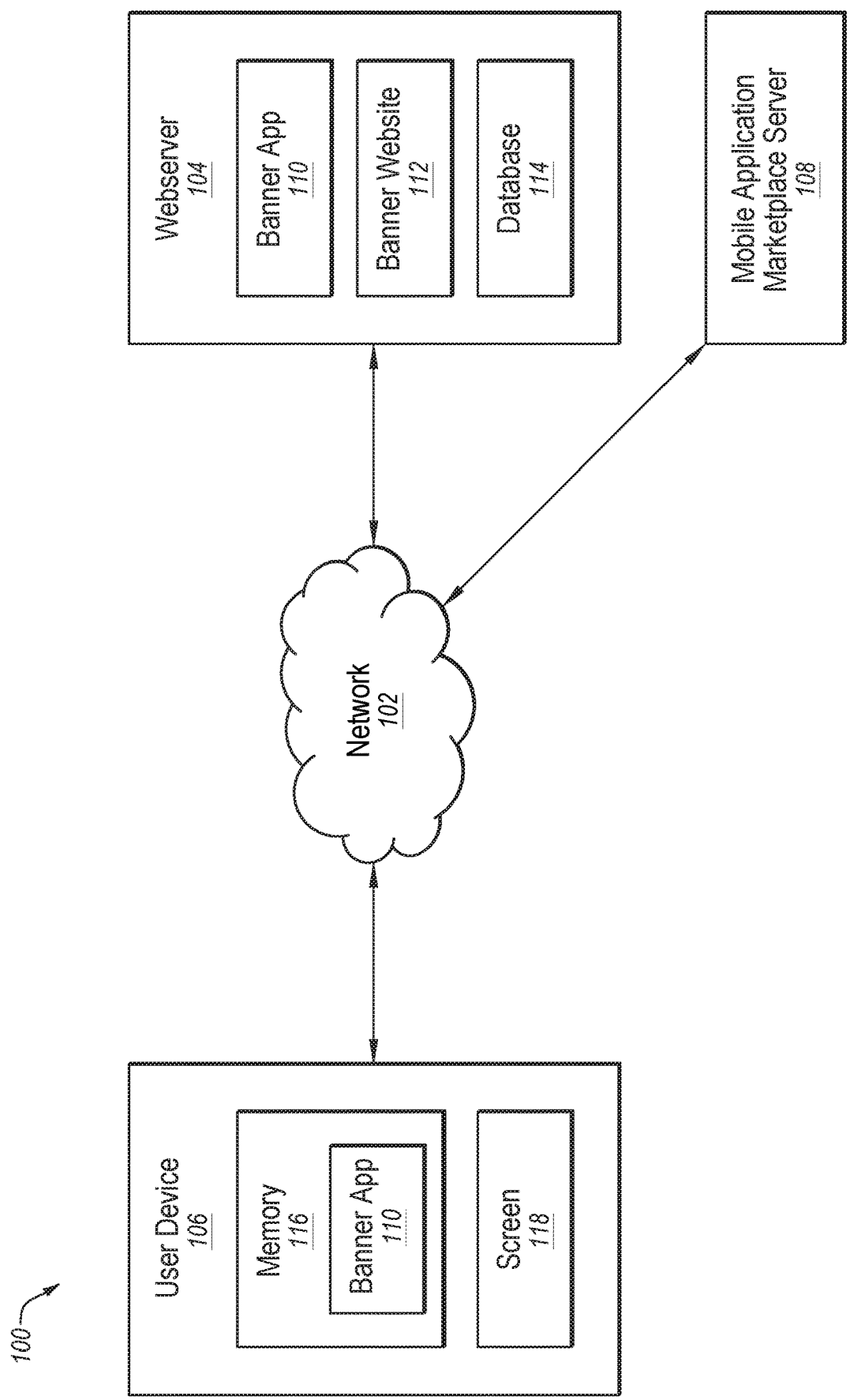
FIG. 1 illustrates an example system configured for presenting digital ads on user devices.

Turning to the figures, FIG. 1 illustrates a system 100 that is configured to present digital ads to consumers on user devices. The system 100 may include a network 102, a webserver 104, a user device 106, and a mobile application marketplace server 108.

In some embodiments, network 102 may be configured to communicatively couple webserver 104, user device 106, and mobile application marketplace 108 to one another using one or more network protocols, such as the network protocols available in connection with the World Wide Web. In some embodiments, network 102 may be any wired or wireless network, or combination of multiple networks, configured to send and receive communications between systems and devices. In some embodiments, network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, network 102 may also be coupled to, or may include, portions of a telecommunications network, including telephone lines, for sending data in a variety of different communication protocols, such as a cellular network or a Voice over IP (VoIP) network.

In some embodiments, webserver 104 may be any computer system capable of communicating over the network 102 to user device 106 and/or mobile application marketplace server 108. Webserver 104 may make one or more mobile and/or web applications available to user device 106, including banner app 110. Webserver 104 may also host one or more websites, such as web portals that include web pages, addressable at a particular web domain. These websites may include a banner website 112.

In some embodiments, banner app 110 may be a mobile app that is available for download through a server, such as mobile application marketplace server 108. Mobile application marketplace server 108 may include, for example, the APP STORE provide by Apple Computer and the ANDROID application website. Banner app 110 may alternatively be a web application that is hosted by webserver 104. In addition, banner app 110 may be a desktop app, which is downloaded and installed on a desktop computer.

In some embodiments, user device 106 is a mobile communication device such as a mobile phone or a tablet computer. In alternative embodiments, user device 106 may be a laptop computer or a desktop computer. User device 106 may include a memory 116 and a screen 118 on which visual information is displayed. In embodiments where user device 106 is a mobile device, banner app 110 may be a mobile app downloaded from mobile application marketplace server 108 such as the APP STORE provide by Apple Computer or the ANDROID application website. Memory 116 may store banner app 110. In embodiments where user device 106 is a laptop or desktop computer, banner app 110 may be provided through a web application that is hosted by webserver 104.

Modifications, additions, or omissions may be made to the system 100 without departing from the scope of the present disclosure. For example, in some embodiments, system 100 may include additional components similar to the components illustrated in FIG. 1 that each may be configured similarly to the components illustrated in FIG. 1.

Banner app 110 may be configured to present windows or banners (hereafter, "banners") that overlay all or a portion of one or more pages that are displayed on screen 118 of user device 106. According to the current disclosure, a "page" may include any visual presentation displayed on screen 118 of user device 106. For example, a page may include a home page of a mobile device, an application, a web page, or any other visual rendering on screen 118. Pages displayed on screen 118 may be interactive and include one or more user input functions, such as buttons, switches, sliders, drop-down menus, text boxes, etc.

Banner app 110 may be configured to display one or more digital ads within the banners. Ads displayed within banners may be static ads or they may be dynamic ads that include videos. Ads that are displayed in the banners may originate from a proprietary database 114 that is within webserver 104. Alternatively or in addition, ads displayed within the banners may originate from an external ad database, such as an advertiser's database, that is in communication with webserver 104.

Users may be able to turn banner app 110 on and off at will. When banner app 110 is on, the banners, including the digital ads they contain, may be configured to always be displayed or kept in the foreground of screen 118 of user device 106. For example, while the banner app 110 is running, the banners presented may be configured to overlay in whole or in part any page that is displayed on screen 118. In some embodiments, banner app 110 may use a picture in picture technology, or other similar technology, that allows the display of an overlay window that is positioned on top of all other pages of user device 106.

Advertisers that present their ads through banner app 110 may choose between a variety of options. For example, in addition to providing the digital ads presented, an advertiser may choose an amount of time for his or her ads are to be displayed through the banner app 110. Additionally or alternatively, the advertiser may choose one or more different "time slots" that specify times during the day or night for their ads to be displayed. The advertiser may pay different price tiers based on the amount of time that ads are displayed and/or the number time slots that are selected.

A user's first experience with banner app 110 may include a guided procedure in banner website 112 to setup an account for the user. The user may initially log in with a username and a temporary password that is generated by banner app 110. Once logged in, the user may choose a personalized password to access his or her account. As described in more detail in connection with FIG. 3A, during the user's initial setup of banner app 110, or during a subsequent interaction with banner website 112 and/or banner app 110, the user may be presented with one or more web pages that allow the user to customize certain features of banner app 110. Alternatively, or in addition, the customization of these features may be performed directly through user input mechanisms on a banner.

Figure 2A:
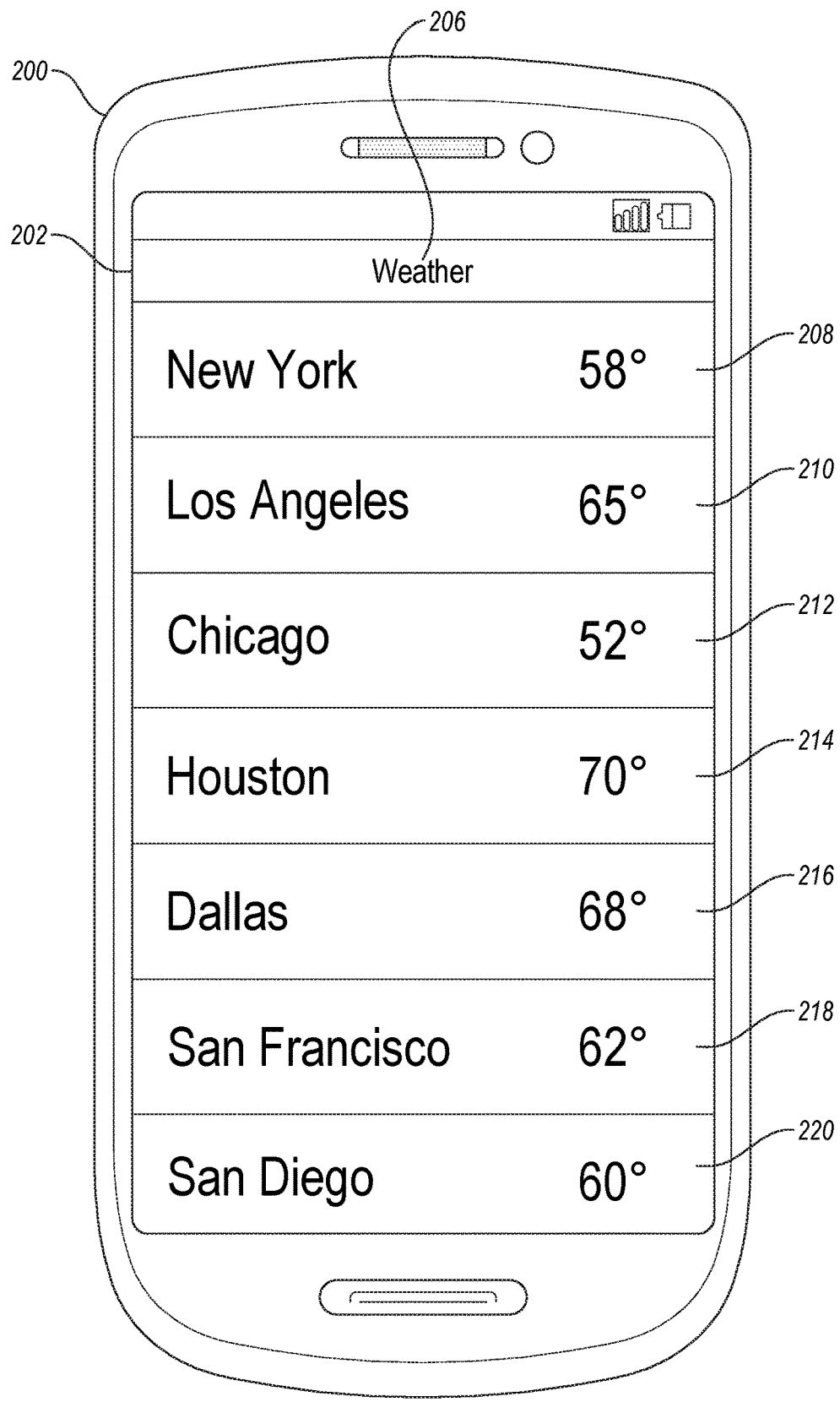
FIG. 2A illustrates a mobile device having a weather app page displayed on a screen.
Figure 2B:
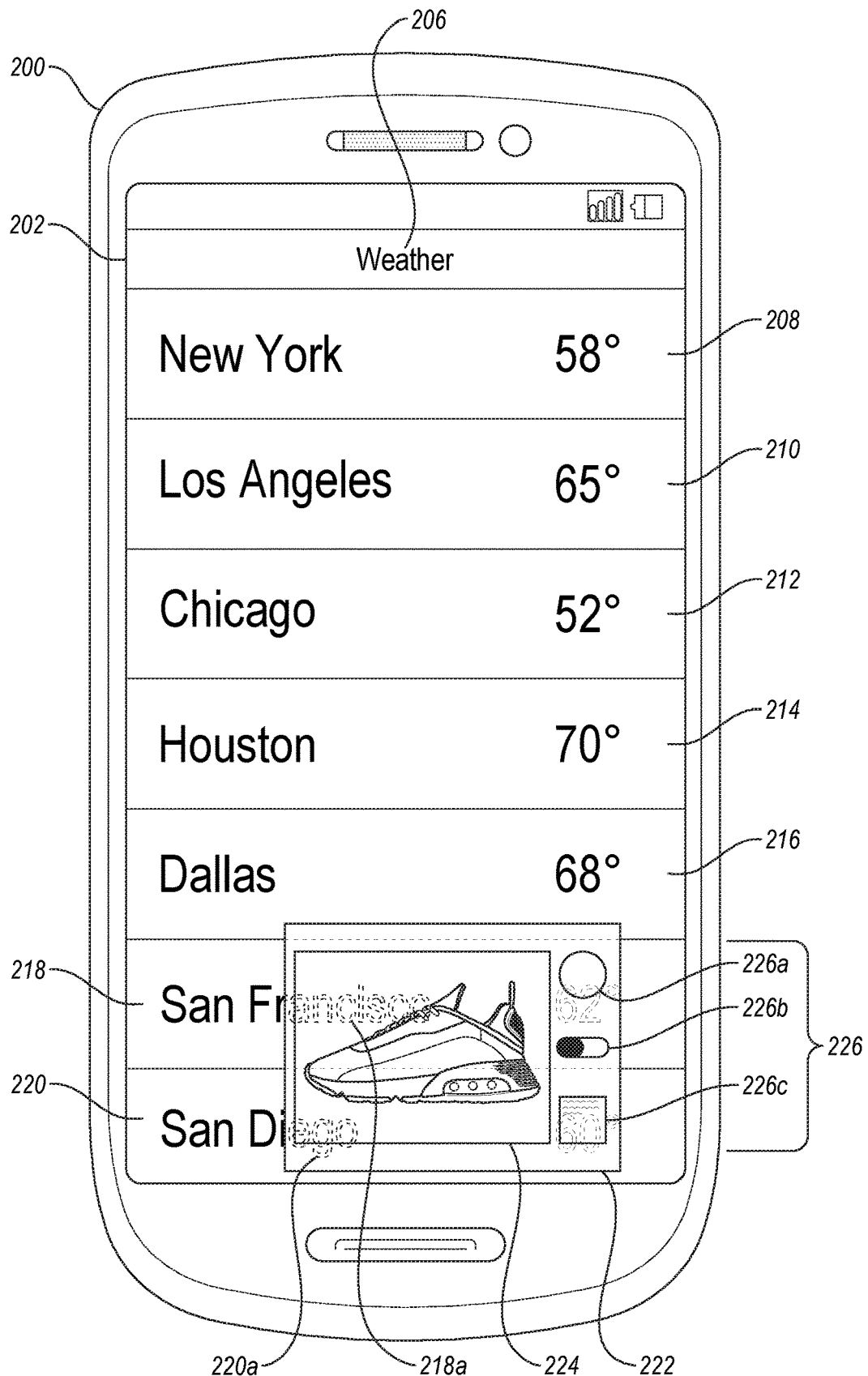
FIG. 2B illustrates the mobile device of FIG. 2A having an exemplary digital ad overlaying a portion of the weather app page.

FIGS. 2A and 2B illustrate a mobile user device 200, having a screen 202. Screen 202 includes a touch sensitive technology. Mobile user device 200 has a banner app as well as a weather app downloaded. The weather app is open and running and a weather page 206 is displayed on screen 202 that provides current temperatures for a variety of cities. For example, current temperatures are provided for New York 208, Los Angeles 210, Chicago 212, Houston 214, Dallas 216, San Francisco 218, and San Diego 220. These cities and/or temperatures may include hypertext links such that a user may select any of the cities and/or temperatures presented, for example by touch, and be taken to a different page on weather app 206 that provides additional weather information for the city selected.

In FIG. 2A, the banner app may not be running, while in FIG. 2B, the banner app is running and a banner 222 is displayed in a bottom portion of screen 202. Banner 222 includes an ad 224 for shoes. Ad 224 may be static or dynamic. Banner 222 is overlaying a portion of weather page 206. Specifically, banner 222 is overlaying portions of current temperatures for San Francisco 218 and San Diego 220. Banner 222, including shoe ad 224, is semi-transparent so that underlying portions 218*a* and 220*a* of current temperatures for San Francisco 218 and San Diego 220, respectively, are still visible through banner 222 and ad 224.

Banner 222 and ad 224 may be configured to be wholly or partially irresponsive to touches or other user input so that the user can interact with input functions that underlie banner 222. For example, when banner 222 is in a passive state, a user may be able to touch underlying portion 218*a* and be taken to another page on the weather app that provides additional weather information for San Francisco. Similarly, a user may be able to touch underlying portion 220*a* and be taken to another page on the weather app that provides additional weather information for San Diego. In other words, when banner 222 is in a passive state, user input, such as a screen touch, is allowed to pass through banner 222 and ad 224 and interact with screen 202 as if banner 222 and ad 224 were not displayed on screen 202.

Alternatively, banner 222 may be configured to be in an active state so that banner 222 and ad 224 are responsive to touches or other user input. For example, ad 224 may include a link to a web page so that when banner 222 is in an active state and the user touches ad 224, he or she is redirected to the linked web page. The linked web page may be part of the advertiser's website or it may be a website affiliated with the banner app. The linked web page may provide the user with additional information about the shoe featured in ad 224 and/or allow the user to purchase the shoe.

In some embodiments, the user may be able to determine the level of responsiveness of banner 222. For example, banner 222 may include one or more input mechanisms 226, such as button 226*a*, that allows the user to select the level of interactivity of banner 222. Specifically, a user may touch button 226*a* to place banner 222 in a passive state so that the user can interact with underlying functions (such as underlying portions 218*a* and 220*a*) without having to move banner 222. Alternatively, a user may touch button 226*a* to place banner 222 in an active state so that the user can interact directly with banner 222 and ad 224. In order to enable this feature, button 226*a* may be configured to remain in an active state at all times and regardless of whether banner 222 is in an active or passive state.

In addition to button 226*a*, banner 222 may include any number of additional input mechanisms 226, such as switch 226*b*, and text box 226*c*. These additional input mechanisms may allow the user to customize any number of other features of banner 222 and/or ad 224 through direct input on banner 222. In one embodiment, through one or more input mechanisms 226 on banner 222, a user may interact directly with ad content displayed in the banner. For example, with regard to ad 224, one or more input mechanisms 226 may allow the user to select a color and/or size of the shoe in ad 224. In addition, through one or more input mechanisms 226 on banner 222, a user may expand the size of banner 222 to overlay a greater amount of an underlying page. With regard to banner 222, a user may provide input that expands the size of banner 222 into a larger portion or all of screen 202. Additional features and/or user input mechanisms may be included in an expanded version of banner 222.

Further, through one or more input mechanisms 226 on banner 222, a user may set a desired level of transparency for banner 222 and/or ad 224. The level of transparency may be selectable from anywhere between 0% and 100%. Users may also be able to decide when to allow the banner app to run on the user's device. Through one or more input mechanisms 226 on banner 222, a user may schedule the days and/or time ranges that the banner app is permitted to run on user device 200.

The banners presented on screen 202 of device 200 by the banner app may be of any size or shape and may be positioned in any location on screen 202. For example, in FIG. 2B, banner 222 is positioned in a bottom, right side corner of screen 202. A user may change the size, shape, or position of banner 222 through one or more input mechanism 226 on banner 222. Alternatively, a user may simply drag banner 222 to a desired location on screen 202 by holding a finger on banner 222 and moving it to a desired location on screen 202. A user may further change the size of the banner by placing two fingers on the banner and either pinching the fingers together to shrink the banner or spreading the fingers apart to expand the banner.

In some embodiments, the banner app may be configured to allow users to provide input on the types of ads that are displayed on banner 222. For example, a user may set preferences for categories of products, services, and/or brands so that ads featuring a preferred category appear more frequently on banner 222. Similarly, users may also set restrictions for certain products, services, and/or brands so that ads featuring a restricted product, service, and/or brand are not displayed on banner 222. Through one or more input mechanisms 226 on banner 222, a user may specify preferences and/or restrictions for products, services, and/or brands. For example, with regard to shoe ad 224, a user may provide input through an input mechanism 226 that identifies the category of shoes or the specific brand of shoe displayed in ad 224 as a preference, or favorite. Alternatively, a user may provide input through an input mechanism 226 that restricts the category of shoes or the specific brand of shoe displayed in ad 224.

Alternatively, a user may enable a "smart ad content" feature that allows the banner app to present digital ads that the app determines are most relevant. For example, by enabling a smart ad content feature, the banner app may present ads based on the usage of device 200. This usage may be determined based on an artificial intelligence analysis of language and/or vision. In one embodiment, a banner app may detect content such as language (for example keywords) and/or vision (for example images) from content displayed on a device. In one embodiment, a banner app analyzes the content underlying a banner. The banner app may then serve ads that are similar or relevant to the content detected. For example, with regard to banner 222, the banner app may detect "New York" and display ads featuring travel accommodations in New York, Broadway shows, New York restaurants, etc. Alternatively, if a banner is overlaying a car racing video game, the banner app may detect this and serve car-related ads. Algorithms used may even detect the make and model of cars displayed and present ads related to these specific vehicles. A smart ad content feature may be enabled and disabled through one or more input mechanisms 226 on banner 222.

In some embodiments, banner 222 and/or ad 224 may be configured to produce sounds. Through one or more input mechanisms 226 on banner 222, users may determine whether to allow banner 222 and/or ad 224 to create sounds. Where the user has elected to allow sounds, one or more input mechanisms 226 on banner 222 may further enable the user to determine the volume of sounds permitted.

In addition, through one or more input mechanisms 226 on banner 222, a user may set a reminder for the user to go back and view the ad at a later time. The user may specify a time to be reminded to view the ad. Alternatively, the user may delay the presentation of ad 224 for a certain amount of time specified by the user. For example, if the user sees ad 224 and is interested in the shoe presented but wants to view ad 224 in more detail at a later time, the user may tag ad 224 through an input mechanism 226 so that a reminder to view the ad is presented to the user at a later time or the ad is delayed for a specified amount of time. Alternatively, through an input mechanism 226 the user may set a time in the future for ad 224 to be presented to the user. In addition, through one or more input mechanisms 226 on banner 222, a user may replay ad 224 within banner 222. For example, if ad 224 is a dynamic ad that includes a video, a user may, through one or more input mechanisms 226 on banner 222, choose to replay ad 224 within banner 222.

Figure 3A:
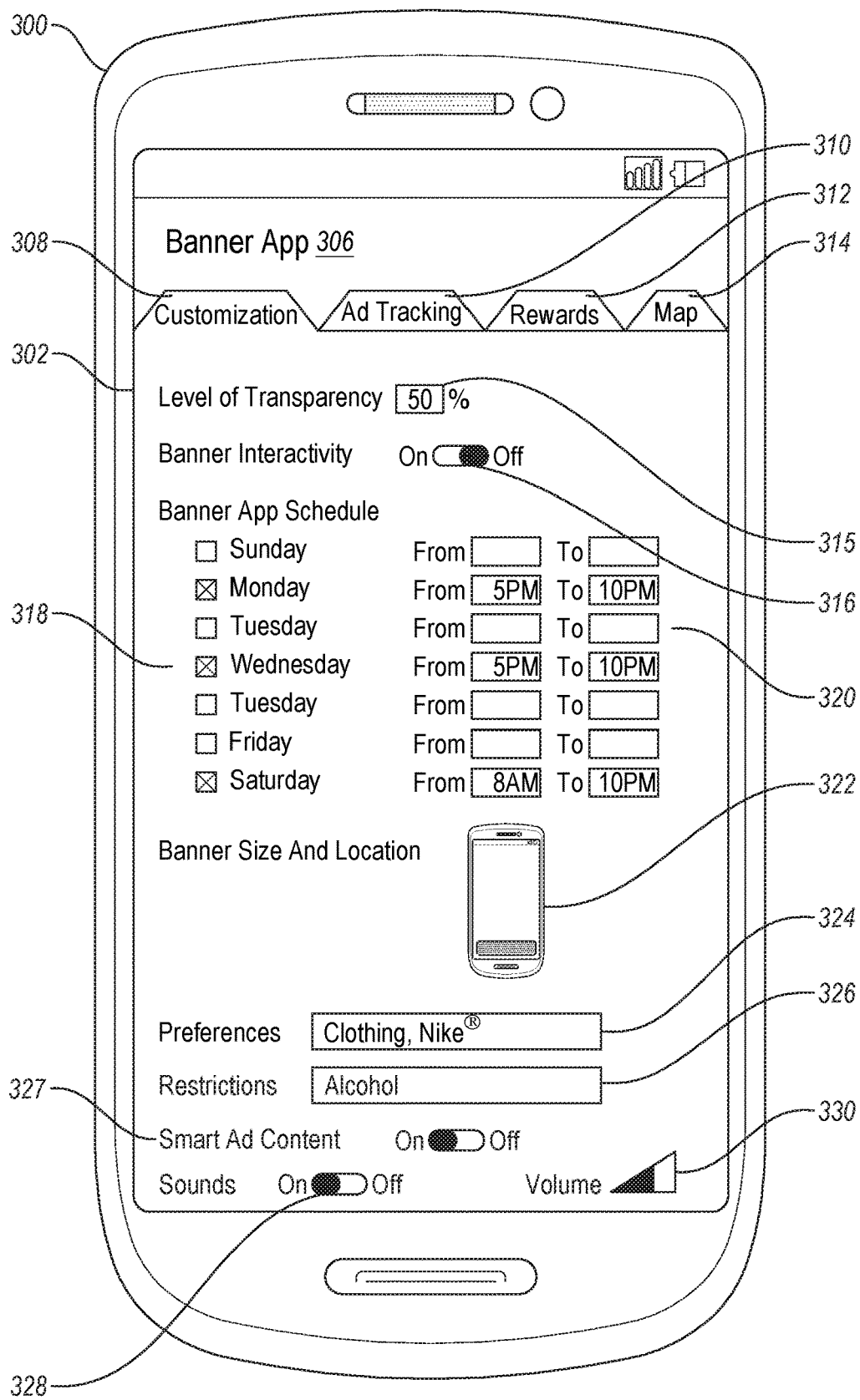
FIG. 3A illustrates an exemplary banner app web page for customizing ads presented by a banner app.

FIG. 3A illustrates a mobile user device 300 having a screen 302. User device 300 also has banner app 306 downloaded and running. On screen 302 is displayed an exemplary "customization" web page 308 of banner app 306. Additional web pages may be provided through banner app 306, including an "ad tracking" web page 310, a "rewards" web page 312, and a "map" web page 314, which are described in more detail in connection with FIGS. 3B, 3C, and 3D, respectively.

Web page 308 allows a user to provide input to customize a variety of features of banner app 306. For example, in some embodiments, the banners, including the digital ads they contain, may be wholly or partially semi-transparent so that some or all of the visual elements of applications and/or functions that are displayed below a banner may remain visible to the user. Through input on web page 308, the user may be able to set a desired level of transparency for the banner and the ads displayed within any range. For example, a user may specify a level of transparency between 0% and 100%. On web page 308, the user has specified through text box 315 a desired level of transparency of 50%. The transparency level set through web page 308 may be a default setting that a user may further adjust through direct interaction with a banner as provided, for example, in FIG. 2B.

In some embodiments, the banners, including the ads they contain, may be configured to be wholly or partially irresponsive to touches or other user input so that a user may interact with input functions that underlie the banner. Through input on web page 308, the user may be able to turn banner interactivity on and/or off. When banner interactivity is turned off, the banner is in a passive state and user input may be allowed to pass through the banner and any ads displayed so that the user can interact with page functions that underlie the banner without having to relocate the banner. When banner interactivity is turned on, the banner is in an active state and a user may be able to interact with a banner and the ads displayed. For example, when a banner is in an active state, a user may interact directly with ad content to select a color, size, etc. of a product featured in the banner. In addition, a user may touch or otherwise select an ad displayed in a banner and be taken to the advertiser's website to receive more information regarding the product or service featured in the ad. On web page 308, the user has turned banner interactivity off through slide switch 316. Banner interactivity set through web page 308 may be a default setting that a user may further adjust through direct interaction with a banner as provided, for example, in FIG. 2B.

In addition, users may be able to decide when to allow banner app 306 to run on a user's device. Through input on web page 308 a user may schedule the days and/or time ranges that banner app 306 is permitted to run on user device 300. For example, on web page 308, days of the week 318 are provided with boxes next to each that allow the user to identify the days that to allow banner app 306 to run. The user has checked boxes next to Monday, Wednesday, and Saturday, thus allowing banner app 306 to run on these days. In addition, text boxes for time ranges 320 are provided for each day. The user has entered a time range from 5 pm to 10 pm for Monday and Wednesday and from 8 am to 10 pm on Saturday. Therefore, banner app 306 will be allowed to run on Monday and Wednesday from 5 pm to 10 pm and on Saturday from 8 am to 10 pm. Outside of these days and times, banner app 306 will not run on user device 300. The schedule settings of banner app 306 on web page 308 may be default settings that a user may manually override or further adjust through direct interaction with a banner as provided, for example, in FIG. 2B.

The banners presented on screen 302 of device 300 by banner app 306 may be of any size or shape and may be positioned in any location on screen 302. For example, banners presented by banner app 306 may cover a horizontal strip on either the top or the bottom of screen 302, or a vertical strip on either the left side or right side of screen 302. Alternatively, the banners presented by banner app 306 may cover the entirety of screen 302. Through input on web page 308, the user may specify a size, shape, and location for the banner. For example, web page 308 includes a screen representation 322 where the user may provide a designation for size and position for the banner. On web page 308, through screen representation 322 the user has specified a horizontal strip at the bottom of a device screen for the banner. Banner size, shape, and position set through web page 308 may be default settings that a user may further adjust through direct interaction with a banner as provided, for example, in FIG. 2B.

In some embodiments, banner app 306 may be configured to allow a user to provide input on the types of ads that are displayed by banner app 306. Through input on web page 308 a user may set preferences for categories of products, services, and/or identify specific brands so that ads featuring something that a user has identified as a preference appear more frequently on ads that appear in banners. Similarly, users may also set restrictions for certain products, services, and/or brands so that ads that feature a restricted product, service, and/or brand are not displayed in banners. For example, on web page 308, the user has set preferences for clothing and the Nike® brand in text box 324. The user has also set a restriction on alcohol in text box 326. Ad preferences and restrictions set through web page 308 may be default settings that a user may further adjust through direct interaction with a banner as provided, for example, in FIG. 2B.

In some embodiments, banner app 306 may be configured to allow a user to enable and disable a smart ad content feature. For example, on web page 308 the user has elected to enable the smart ad content feature through slide switch 327. The smart ad content feature may use artificial intelligence and one or more algorithms to analyze a user's screen content. For example, banner app 306 may analyze a page that is underlying a banner to determine what type of ads to include in the banner. This analysis may include both language (for example keywords) and vision (for example images). Based on this analysis, ads that are related to the language and/or vision of an underlying page may be featured in a banner. The smart ad content feature set through web page 308 may be a default setting that a user may further adjust through direct interaction with a banner as provided, for example, in FIG. 2B.

In some embodiments, the banners and/or the ads featured on banners may be configured to produce sounds. Through input on web page 308, users may determine whether to allow ads banners or the ads they feature to create sounds. For example, on web page 308, the user has elected to allow sounds though slide switch 328. In addition, users may determine the volume of any sounds permitted. On web page 308, the user has set the volume 330 to a desired level. In alternative embodiments, the user may further specify time periods to allow sounds, similar to the way in which users scheduled days and times for banner app 306 to run. For example, a user may provide input scheduling sounds to be allowed only on certain days and during certain times. Sound permission and volume set through web page 308 may be default settings that a user may further adjust through direct interaction with a banner as provided, for example, in FIG. 2B.

In certain implementations, a single account on the banner app may cover multiple user profiles. For example, multiple users that are part of the same family or household may be part of the same "family" account. Each user that is included within the family account can provide input to customize the variety of features of banner app 306 provided in FIG. 3A, above. For example, each user within the family account may have his or her own profile with custom preferences for the ads displayed on their devices. However, a primary family member (such as a parent or guardian) may set limitations and/or restrictions on the profiles of one or more of the users that are part of the family account. These limitations and/or restrictions may include a category of product, such as tobacco or alcohol. These limitations and/or restrictions may also include the type of ad presented. For example, ads that feature suggestive or pornographic content may be excluded. Through these limitations and restrictions, exposure to certain ads and/or ad content may be avoided for designated members within the family account.

Figure 3B:
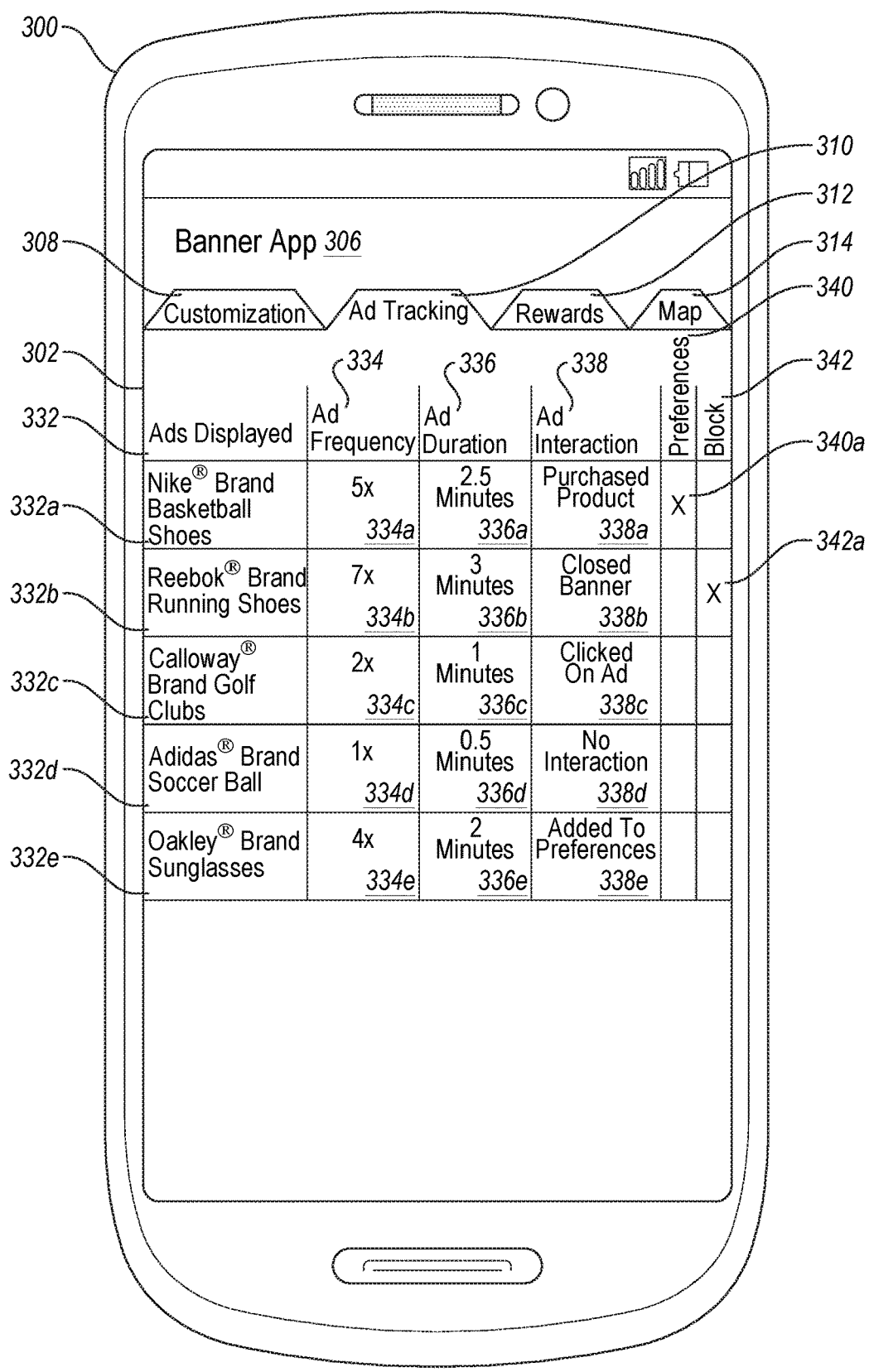
FIG. 3B illustrates an exemplary banner app web page for tracking ads presented by the banner app.

FIG. 3B illustrates screen 302 having an "ad tracking" web page 310 displayed. After a user has completed the setup of his or her account of banner app 306 and is logged in, the user may stay logged in for a period of time. For example, a user may remain logged in for a week or a month or some other period of time. Once the predetermined period of time has expired, banner app 306 may prompt the user to click on a button to reenter his or her username and password.

While a user is logged in, an ad tracking functionality of banner app 306 may be enabled. This ad tracking functionality allows banner app 306 to track the ads presented to the user (including ads that are presented through banner app 306 as well as ads displayed through other means, such as internet browsers and social media apps). In order to track ads, the ads presented may contain a cookie that is automatically downloaded to a user's device. Banner app 306 may decrypt the cookie coming from the ad and use it to track the ads presented. This may eliminate the necessity of a separate web browser plug-in.

Ad tracking web page 310 may show a list 332 of all ads previously displayed on user device 300. List 332 may be a simple description of the product and/or service presented in the ads presented. Alternatively, list 332 may include a visual of the actual ad presented to the user. In the embodiment presented in web page 310, a simple description of the products and services presented in the ads is provided. For example, web page 310 includes a list of 5 different ads that were previously displayed on user device 300. The first ad 332a is described as "Nike® brand basketball shoes." The second ad 332b is described as "Reebok® brand running shorts." The third ad 332c is described as "Calloway® brand golf clubs." The fourth ad 332d is described as "Adidas® brand soccer ball." The fifth ad 332e is described as "Oakley® brand sunglasses." Web page 310 may include links for each description of ads 332a-e so that a user may click on one of ad descriptions 332a-e to view the actual ad or be taken to advertiser's website or another website to obtain additional information regarding the product and/or finalize a purchase of the product.

In addition to tracking the ads displayed, banner app 306 may also track a number of times that the ad was shown to the user and display this information in a frequency field 334. Banner app 306 may track how long the ad was displayed to the user in a duration field 336. Banner app 306 may track the user's level of interaction with the ad in an interaction field 338. Interaction field 338 may track, for example, whether the user closed the banner containing the ad, clicked on the ad, saved the ad to a list of preferences, set a reminder to view the ad later, etc.

With regard to first ad 332a, field 334a confirms that the user was shown this ad a total of 5 times. Field 336a confirms that first ad 332a was shown to the user for a total of 2.5 minutes. Finally, field 338a describes the level of interaction with first ad 332a as "purchased product." With regard to second ad 332b, field 334b confirms that the user was shown this ad a total of 7 times. Field 336b confirms that second ad 332b was shown to the user for a total of 3 minutes. Finally, field 338b describes the level of interaction with second ad 332b as "closed banner." With regard to third ad 332c, field 334c confirms that the user was shown this ad a total of 2 times. Field 336c confirms that third ad 332c was shown to the user for a total of 1 minute. Finally, field 338c describes the level of interaction with third ad 332c as "clicked on ad." With regard to fourth ad 332d, field 334d confirms that the user was shown this ad just 1 time. Field 336d confirms that fourth ad 332d was shown to the user for a total of 0.5 minutes. Finally, field 338d describes the level of interaction with fourth ad 332d as "no interaction." With regard to fifth ad 332e, field 334e confirms that the user was shown this ad a total of 4 times. Field 336e confirms that fifth ad 332e was shown to the user for a total of 2 minutes. Finally, field 338e describes the level of interaction with fifth ad 332e as "added to preferences."

Through ad tracking web page 310, a user may also provide input to set a preference 340 for the type of product, service, and/or brand of the ads in list 332. Similarly, the user may set a restriction 342 for the type of product, service, and/or brand of the ads in list 332. For example, on web page 310, the user has added first ad 332a to his or her preferences in field 340a and set a restriction for second ad 332b in field 342a.

Figure 3C:
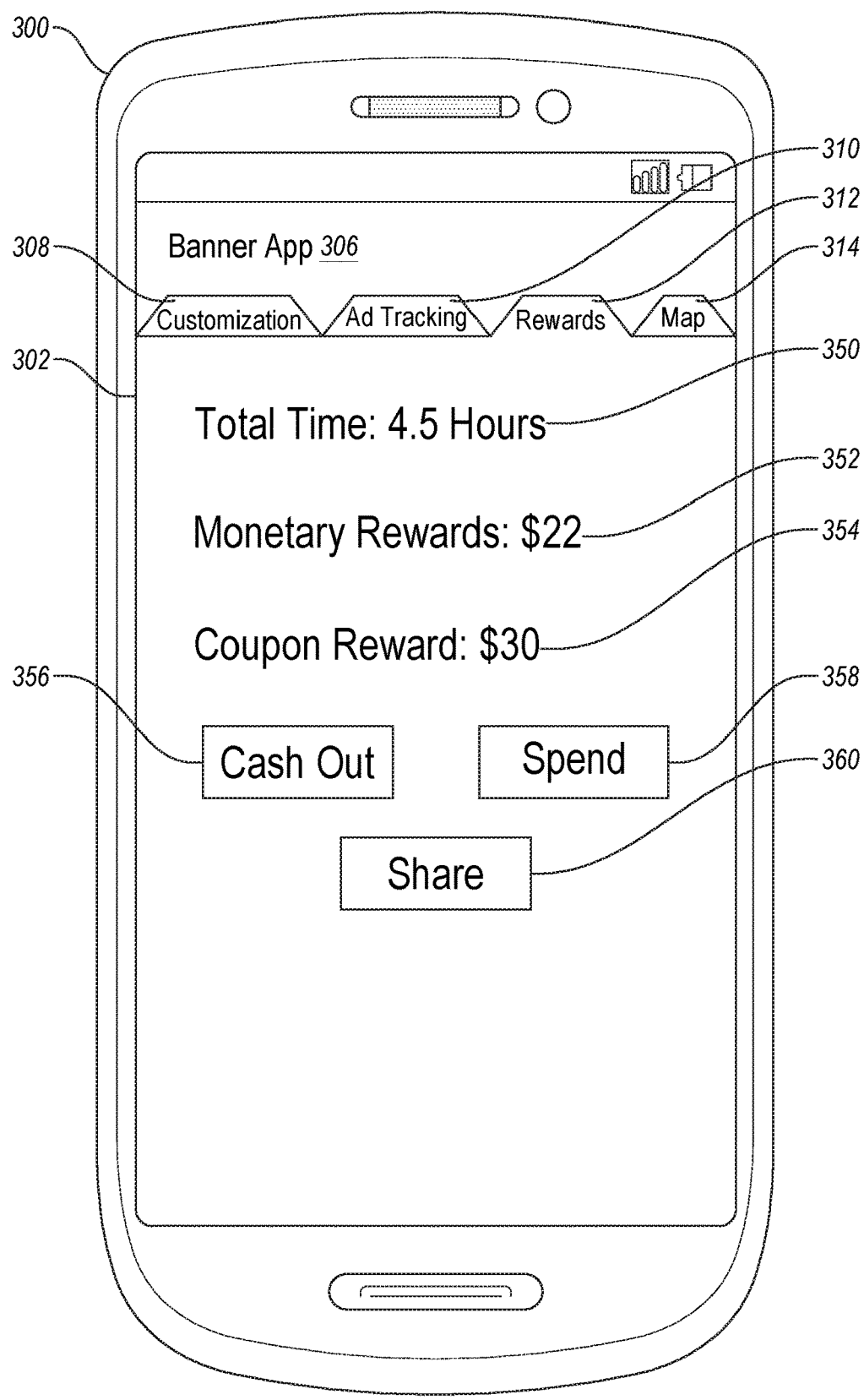
FIG. 3C illustrates an exemplary banner app web page for rewards earned from the banner app.

FIG. 3C illustrates screen 302 having an "rewards" web page 312 displayed. Banner app 306 may keep track of the amount of time that a banner has been visible on screen 302 of user device 300. Banner app 306 may provide rewards to the user based on the amount of time tracked. In some embodiments, the value of the reward may be a fixed percentage of the monetary amount that an advertiser pays to have his or her ads displayed through banner app 306. The reward may be redeemed in various forms, including cash, coupons, gift cards, and discounts for specified products. Any cash earned by the user can be "cashed out" to different financial accounts, such as the user's bank account, PayPal account, Venmo account, etc.

Alternatively, or in addition, the user may receive a reward based on his or her interaction with an ad. For example, if the user decides to purchase a product that is advertised in a banner, he or she may be provided with a coupon from banner app 306. The coupon may include a variable amount to be spent towards the purchase of the product. The amount of the coupon may be taken from an amount that an advertiser pays affiliates for selling the advertiser's products. This is also known as an "affiliate commission."

Rewards web page 312 may display a total amount of time 350 that the user has kept a banner visible on screen 302. For example, on web page 312, a banner has been visible on screen 302 for a total of 4.5 hours. In addition, web page 312 may display the current value of rewards earned. For example, on web page 312, the user has earned $22 in monetary rewards 352 and $30 in coupon rewards 354. Web page 312 also provides the user with the option of cashing out their monetary reward through a "cash out" button 356. As provided previously, the monetary reward cashed out may be delivered different financial accounts, such as a user's bank account, PayPal account, Venmo, etc. The monetary rewards may also be cashed out in the form of one or more gift cards. In addition, or alternatively, a user may select a "spend" button 358 to apply all or some of the monetary reward 352 and/or coupon reward 354 toward the purchase of an advertised product through an online or through an in-app purchase. Finally, a user may select a share button 360 to share the monetary reward 352 and/or coupon reward 354 with friends and family members that also have an account on banner app 306.

Figure 3D:
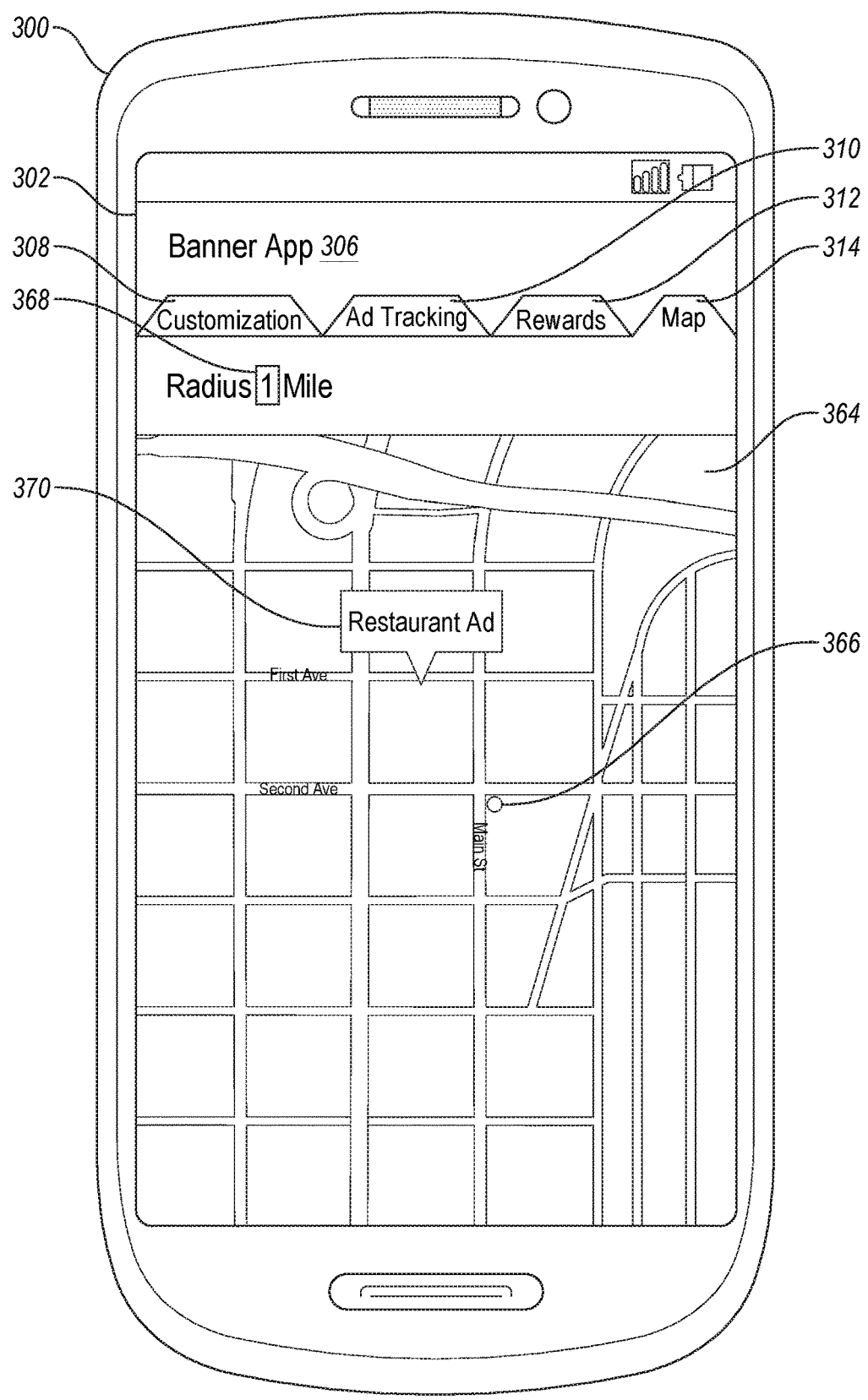
FIG. 3D illustrates an exemplary banner app web page for a map function of the banner app.

FIG. 3D illustrates screen 302 having a "map" web page 314 displayed. Banner app 306 may access a user's location using a GPS feature on user device 300. Use of a GPS feature on user device 300 may require permission from the user. Once permission is granted (if necessary) map web page 314 may display a map 364 that corresponds to the physical location of user device 300. A symbol 366 may indicate the location of user device 300 on map 364. The user may provide input to determine the scale of map 364. On map 364, the user has designated through radius input field 368 that map 364 should be scaled to display a 1 mile radius around user device 300. Any scale determination is possible, for example, the user may select a larger radius, such as 10 miles or a smaller radius such as 0.5 miles.

In some embodiments, map 364 is configured to display ads based on the location of user device 300. For example, banner app 306 may present the user with ads for stores that are within the distance determined in radius input field 368. Ads presented based on the location of user device 300 may identify stores that are having sales. Further, retailers may provide discount codes, exclusive offers or other rewards to users based on the location of user device 300. For example, a retailer may offer a 10% off coupon to users that are within a 1 block radius of the retailer's location. These offers may be provided to the user through any means, including a banner ad, text message, email, and/or mobile push notification. These offers may specify an amount of time for which the offer is valid and other limitations.

With regard to map 364, an ad 370 for a restaurant is presented on map 364 at the location of the restaurant. This ad may also be presented in an overlay banner, such as overlay banner 222 illustrated in FIG. 2B. Portions of map 364 may be presented in the overlay banners where these ads are presented so that the user can see how far away the retailer is.

Figure 4:
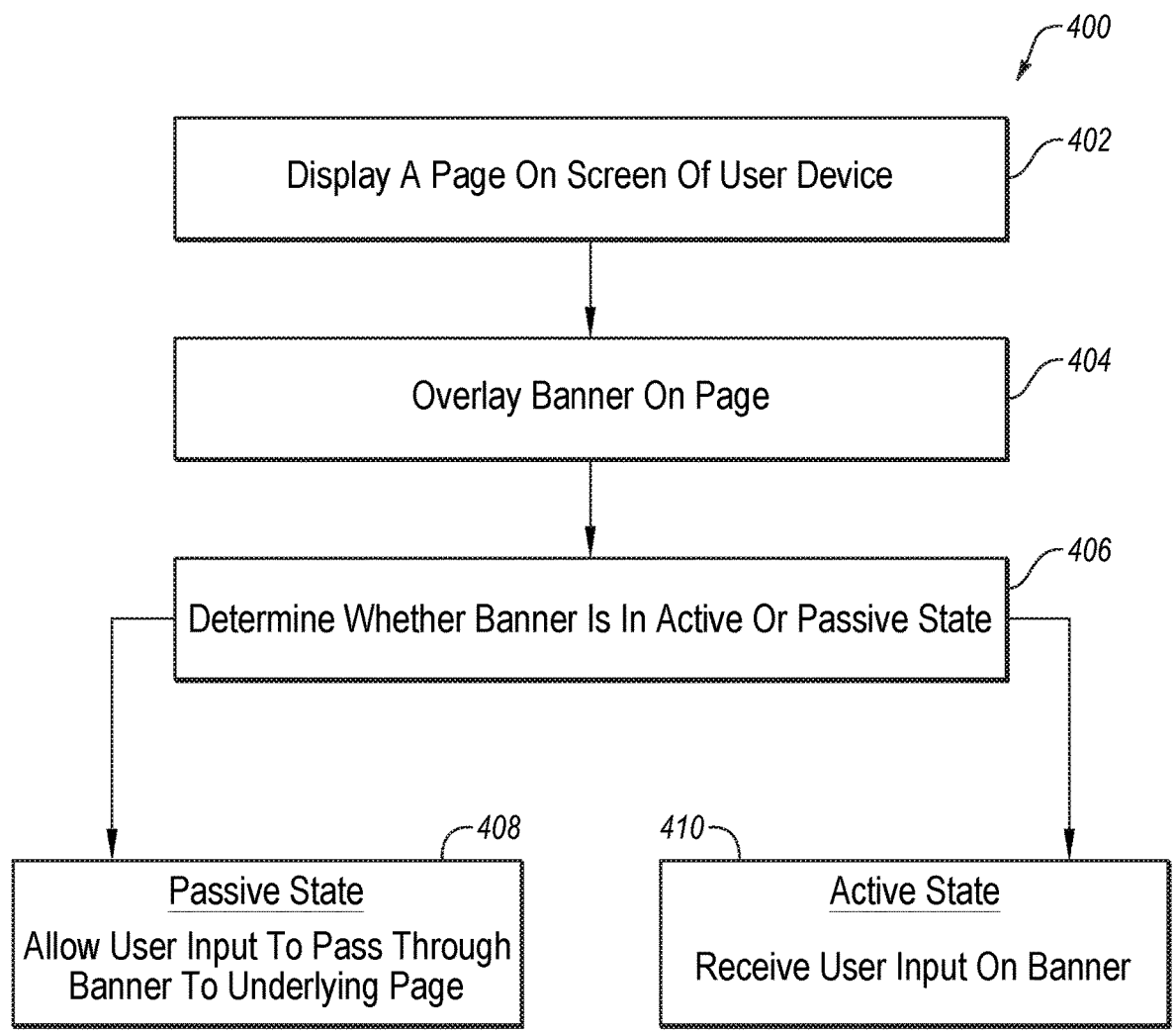
FIG. 4 is a flowchart of an example method for presenting digital ads on user devices.

FIG. 4 is a flowchart of an example method 400 for presenting digital ads on user devices. The method 400 may include, at action 402, displaying a page on a screen of a user device. A page may be any visual presentation that is displayed on the screen of a user device. Games, social media pages, and news apps are all examples of possible pages. Pages may be interactive and include one or more user input functions such as buttons, switches, sliders, drop-down menus, text boxes, etc.

The method 400 may include, at action 404, overlaying a banner on the page. The banner may include one or more ads. The ads presented on a banner may be static or dynamic. For example, one or more of the ads presented may include a video. The banner, including any ads presented, may be semi-transparent so that an underlying portion of the page may remain visible under the banner.

The method 400 may include, at action 406, determining whether the banner is in a passive or active state. In a passive state, shown in action 408, any user interaction on the banner may be allowed to pass through the banner to the underlying page. For example, a user may select a link that is below the banner when the banner is in a passive state. Alternatively, the banner may be in an active state as shown in action 410. In an active state, user interaction on the banner may be received by the banner. For example, the banner may include one or more user input functions and/or an ad contained on the banner may include a link to a web page. When the banner is in an active state, a user may be able to interact with input functions on the banner and/or links in the ad.

In some embodiments, a user may be able to indicate whether the banner is in a passive or active state. For example, a user may specify through a customization page (such as page 308 illustrated in FIG. 3A) the preferred state of banners presented. This preferred state may be a default state for all banners presented on the user device. In some embodiments, a user may be able to override the default state setting through the banner itself. For example, the banner may include a button or other input function that allows the user to toggle back and forth between active and passive states of a banner (such as button 226a illustrated in FIG. 2B). This button may remain at all times in an active state in order to allow the user to interact with the button even when the banner is in a passive state.

Figure 5:
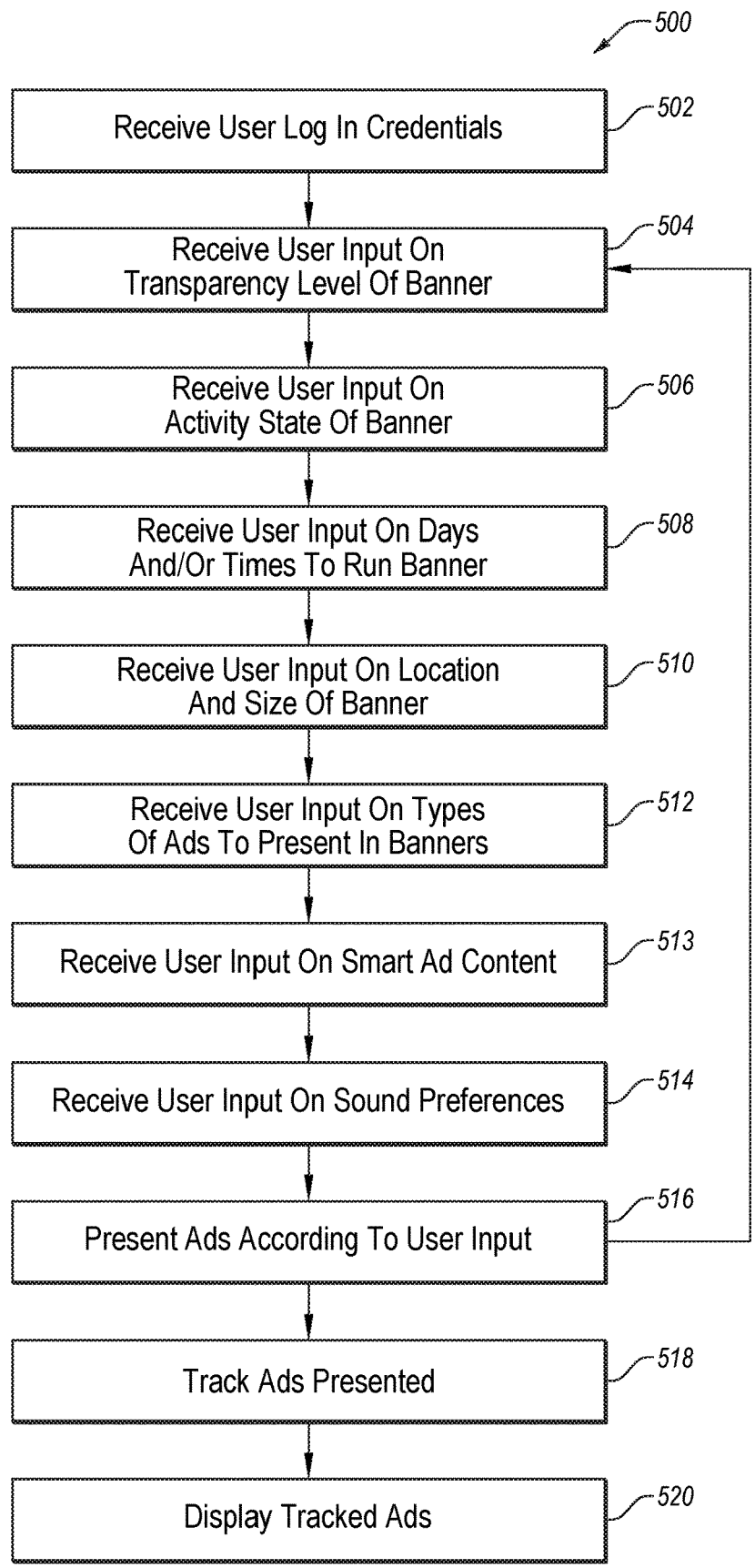
FIG. 5 is a flowchart of an example method for customizing and tracking ads presented by a banner app.

FIG. 5 is a flowchart of an example method 500 for customizing ads presented in banner app. The method 500 may include, at action 502, a user's login credentials. A user's first experience with the banner app may include guiding the user through an account setup process. The user may select a username and a password or be provided a temporary password for the initial login the banner app.

Once the user has created an account and is logged into the banner app, the method 500 may include, at action 504, receiving user input on a transparency level of the banners presented by the banner app. The level of transparency may be set to any level between 0% and 100%. Setting the level of transparency for a banner may also set the level of transparency for any ads displayed in the banner to the same level. The user input to determine the level of transparency may be received during the initial setup of the user's account or during a subsequent interaction with a web page associated with the banner app. This input may establish a default setting for the level of transparency for all banners and ads subsequently displayed through the banner app.

The method 500 may include, at action 506, receiving user input on an activity state of the banners presented by the banner app. The activity state may be set to either a passive state where user input on a banner is allowed to pass through the banner to an underlying page. Alternatively, the activity state may be set to an active state where user input on a banner is received by the banner. For example, when a banner is in an active state, a user may interact with one or more user input mechanism on the banner or an ad displayed on the banner. The user input to determine the activity state may be received during the initial setup of the user's account or during a subsequent interaction with a web page associated with the banner app. This input may establish a default setting for the activity state for all banners and ads subsequently displayed through the banner app.

The method 500 may include, at action 508, receiving user input on days and/or times to run the banner app. This timing setting may allow a user to schedule the days and/or times that the banner app is allowed to run on the user's device. The user input to determine the days and/or times to run the banner app may be received during the initial setup of the user's account or during a subsequent interaction with a web page associated with the banner app. This input may establish a default setting for a schedule to run the banner app.

The method 500 may include, at action 510, receiving user input on a location and size of banners displayed on a screen of the user's device. This positional setting may allow a user to indicate where, on the user's screen, the banner should be located. The user input to determine the location and size of banners displayed may be received during the initial setup of the user's account or during a subsequent interaction with a web page associated with the banner app. This input may establish a default setting for the location and size for all banners and ads subsequently displayed through the banner app.

The method 500 may include, at action 512, receiving user input on the types of ads to present in the banners presented by the banner app. For example, a user may identify preferences for certain products, services, and/or brands. Alternatively, a user may restrict ads for certain products, services, and/or brands. This input may establish a default setting for the types of ads subsequently displayed through the banner app.

The method 500 may include, at action 513, receiving user input on smart ad content. The smart ad content feature may use artificial intelligence and one or more algorithms to analyze a user's screen content. For example, a banner app may analyze a page that is underlying a banner to determine what type of ads to include in the banner. This analysis may include both language (for example keywords) and vision (for example images). Based on this analysis, ads that are related to the language and/or vision of an underlying page may be featured in an overlying banner. This input may establish a default setting for the types of ads subsequently displayed through the banner app.

The method 500 may include, at action 514, receiving user input on sound preferences for the ads presented by the banner app. For example, a user may restrict sounds on all ads displayed by the banner app. Alternatively, the user may allow sounds but specify a volume for the sounds permitted. This input may establish a default setting for sound preferences on the ads subsequently displayed through the banner app.

The method 500 may include, at action 516, presenting ads through the banner app according to the default settings established from the user input received. While ads are presented in a banner on the user's screen, a user may, through user input received directly on a banner, override the default settings previously established. For example, a user may modify or change a transparency level, activity state, timing setting, positional setting, ad types, and sound preferences through one or more input mechanisms located on a banner. These changes and modifications received directly on a banner may create new default settings for subsequent ads displayed. Alternatively, the changes and modifications may be limited to the banner on which the input is received.

The method 500 may include, at action 518, tracking the ads presented. The information tracked may include not only the ads presented but also include a number of times an ad has been presented, an amount of time that an ad has been displayed on a user's screen, and what type of interaction the user had with the ad. The method 500 may include, at action 520, displaying this information. This information may be displayed through a web page associated with the banner app.

Figure 6:
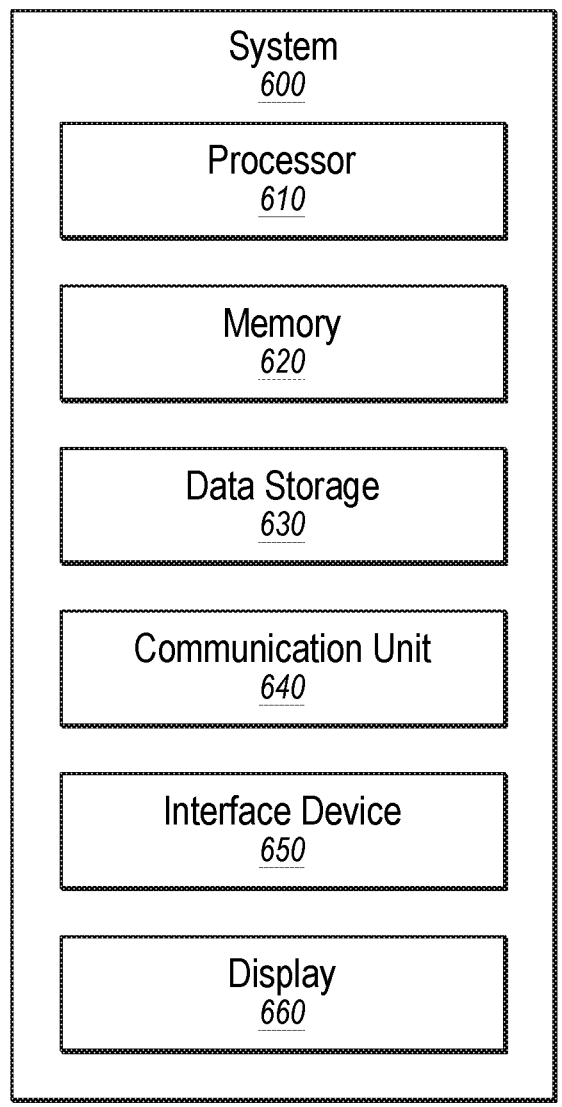
FIG. 6 illustrates an example computer system that may be employed in presenting digital ads on user devices.

FIG. 6 illustrates an example computer system 600 that may be employed in presenting digital ads on user devices. In some embodiments, the computer system 600 may be part of any of the systems or devices described in this disclosure. For example, the computer system 600 may be part of any of the webserver 104, the user device 106 and the mobile application marketplace server 108 of FIG. 1.

The computer system 600 may include a processor 602, a memory 604, a file system 606, a communication unit 608, an operating system 610, a user interface 612, and a security module 614, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 602 may include any suitable special-purpose or general-purpose computer, computing entity, or processing device including various computer hardware or software modules and may be configured to execute instructions stored on any applicable computer-readable storage media. For example, the processor 602 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 602 may interpret and/or execute program instructions and/or process data stored in the memory 604 and/or the file system 606. In some embodiments, the processor 602 may fetch program instructions from the file system 606 and load the program instructions into the memory 604. After the program instructions are loaded into the memory 604, the processor 602 may execute the program instructions. In some embodiments, the instructions may include the processor 602 performing one or more of the actions of the method 400 of FIG. 4 or method 500 of FIG. 5.

The memory 604 and the file system 606 may include computer-readable storage media for carrying or having stored thereon computer-executable instructions or data structures. Such computer-readable storage media may be any available non-transitory media that may be accessed by a general-purpose or special-purpose computer, such as the processor 602. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 602 to perform a certain operation or group of operations, such as one or more of the actions of method 400 of FIG. 4 or method 500 of FIG. 5. These computer-executable instructions may be included, for example, in the operating system 610, in one or more applications, such as the security module 614, or in some combination thereof.

The communication unit 608 may include any component, device, system, or combination thereof configured to transmit or receive information over a network, such as the network 102 of FIG. 1. In some embodiments, the communication unit 608 may communicate with other devices at other locations, the same location, or even other components within the same system. For example, the communication unit 608 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 608 may permit data to be exchanged with a network and/or any other devices or systems, such as those described in the present disclosure.

The operating system 610 may be configured to manage hardware and software resources of the computer system 600 and configured to provide common services for the computer system 600.

The user interface 612 may include any device configured to allow a user to interface with the computer system 600. For example, the user interface 612 may include a display, such as an LCD, LED, a touchscreen, or other display, that is configured to present video, text, application user interfaces, and other data as directed by the processor 602. The user interface 612 may further include a mouse, a track pad, a keyboard, a touchscreen, volume controls, other buttons, a speaker, a microphone, a camera, any peripheral device, or other input or output device. The user interface 612 may receive input from a user and provide the input to the processor 602. Similarly, the user interface 612 may present output to a user.

The security module 614 may be one or more computer-readable instructions stored on one or more non-transitory computer-readable media, such as the memory 604 or the file system 606, that, when executed by the processor 602, is configured to perform one or more of the actions of the method 400 of FIG. 4 or method 500 of FIG. 5. In some embodiments, the security module 614 may be part of the operating system 610 or may be part of an application of the computer system 600 or may be some combination thereof.

Modifications, additions, or omissions may be made to the computer system 600 without departing from the scope of the present disclosure. For example, although each is illustrated as a single component in FIG. 6, any of the components 602-614 of the computer system 600 may include multiple similar components that function collectively and are communicatively coupled. Further, although illustrated as a single computer system, it is understood that the computer system 600 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 602 of FIG. 6) including various computer hardware or software modules, as discussed in greater detail below. Further, as indicated above, embodiments described herein may be implemented using computer-readable media (e.g., the memory 604 or file system 606 of FIG. 6) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for presenting digital ads on user devices, the method comprising:
   displaying a page on a screen of a user device;
   overlaying a banner above at least a portion of the page, wherein the banner includes at least one ad and the banner covers an underlying portion of the page;
   determining whether the banner is in a passive or an active state, wherein when the banner is in the passive state, user input on the banner passes through the banner to the underlying portion of the page and when the banner is in the active state, user input on the banner is received by the banner;
   upon determining that the banner is in the passive state, receiving a first user input on the banner; and
   allowing the first user input to pass through the banner to the underlying portion of the page.

2. The method as recited in claim 1, wherein the user device is a mobile device, the screen includes a touch sensitive technology, and the user input is a touch on the screen of the user device.

3. The method as recited in claim 1, wherein the banner and the at least one ad have a level of transparency that allows the underlying portion of the page to remain visible through the banner and the at least one ad.

4. The method as recited in claim 3, wherein a transparency input mechanism allows the user of the user device to select the level of transparency of the banner and the at least one ad and wherein the transparency input mechanism is located on the banner.

5. The method as recited in claim 1 further comprising:
   receiving a second user input through an interactivity input mechanism changing the banner from the passive state to the active state;
   receiving a third user input on the banner; and
   receiving the third user input on the banner.

6. The method as recited in claim 5, wherein the interactivity input mechanism is on the banner and is configured to remain in an active state regardless of whether the banner is in an active or passive state.

7. A system for presenting digital ads on user devices comprising:
   a memory storing program instructions;
   a processor coupled to the memory and configured to execute the program instructions, wherein the program instructions are executable by the processor to:

display a page on a screen of a user device;

overlay a banner above at least a portion of the page, wherein the banner includes at least one ad and the banner covers an underlying portion of the page;

determine whether the banner is in a passive or an active state, wherein when the banner is in the passive state, user input on the banner passes through the banner to the underlying portion of the page and when the banner is in the active state, user input on the banner is received by the banner;

upon determining that the banner is in the passive state, receiving a first user input on the banner; and allowing the first user input to pass through the banner to the underlying portion of the page.

8. The system as recited in claim 7, wherein the user device is a mobile device, the screen includes a touch sensitive technology, and the user input is a touch on the screen of the user device.

9. The system as recited in claim 7, wherein the banner and the at least one ad have a level of transparency that allows the underlying portion of the page to remain visible through the banner and the at least one ad.

10. The system as recited in claim 9, wherein a transparency input mechanism allows the user of the user device to select the level of transparency of the banner and the at least one ad and wherein the transparency input mechanism is located on the banner.

11. The system as recited in claim 7, wherein the program instructions are further executable by the processor to:

receive a second user input through an interactivity input mechanism changing the banner from the passive state to the active state;

receive a third user input on the banner; and receive the third user input on the banner.

12. The system as recited in claim 11, wherein the interactivity input mechanism is on the banner and is configured to remain in an active state regardless of whether the banner is in an active or passive state.

13. A non-transitory computer readable storage medium storing program instructions, wherein the program instructions are executable by a processor to:

display a page on a screen of a user device;

overlay a banner above at least a portion of the page, wherein the banner includes at least one ad and the banner covers an underlying portion of the page; and determine whether the banner is in a passive or an active state, wherein when the banner is in the passive state, user input on the banner passes through the banner to the underlying portion of the page and when the banner is in the active state, user input on the banner is received by the banner;

when the banner is determined to be in the passive state, receive a first user input on the banner; and allow the first user input to pass through the banner to the underlying portion of the page.

14. The non-transitory computer readable storage medium as recited in claim 13, wherein the user device is a mobile device, the screen includes a touch sensitive technology, and the user input is a touch on the screen of the user device.

15. The non-transitory computer readable storage medium as recited in claim 13, wherein the banner and the at least one ad have a level of transparency that allows the underlying portion of the page to remain visible through the banner and the at least one ad.

16. The non-transitory computer readable storage medium as recited in claim 15, wherein a transparency input mechanism allows the user of the user device to select the level of transparency of the banner and the at least one ad and wherein the transparency input mechanism is located on the banner.

17. The non-transitory computer readable storage medium as recited in claim 13, wherein the program instructions are further executable by the processor to:

receive a second user input through an interactivity input mechanism changing the banner from the passive state to the active state;

receive a third user input on the banner; and receive the third user input on the banner.

\* \* \* \* \*